US010740771B2

(12) United States Patent
Sun et al.

(10) Patent No.: US 10,740,771 B2
(45) Date of Patent: Aug. 11, 2020

(54) METHOD AND SYSTEM FOR TWO-DIMENSIONAL CHARTING USING LIVE QUERIES

(71) Applicant: Clari Inc., Sunnyvale, CA (US)

(72) Inventors: Mark Shuai Sun, Sunnyvale, CA (US); Matthew King, Sunnyvale, CA (US)

(73) Assignee: CLARI INC., Sunnyvale, CA (US)

( * ) Notice: Subject to any disclaimer, the term of this patent is extended or adjusted under 35 U.S.C. 154(b) by 0 days.

(21) Appl. No.: 16/264,588

(22) Filed: Jan. 31, 2019

(65) Prior Publication Data

US 2019/0164179 A1 May 30, 2019

Related U.S. Application Data

(62) Division of application No. 15/223,673, filed on Jul. 29, 2016, now Pat. No. 10,235,685.

(51) Int. Cl.
*G06Q 30/02* (2012.01)
*G06T 11/20* (2006.01)
*G06T 11/00* (2006.01)

(52) U.S. Cl.
CPC ........ *G06Q 30/0201* (2013.01); *G06T 11/001* (2013.01); *G06T 11/206* (2013.01)

(58) Field of Classification Search
CPC ............................... G06Q 10/00; G06Q 40/00
USPC ....................................................... 705/7.29
See application file for complete search history.

(56) References Cited

U.S. PATENT DOCUMENTS

| 7,519,173 B2 | 4/2009 | Flores | G06Q 10/063112 379/265.01 |
| 8,005,700 B2 * | 8/2011 | Amitabh | G06Q 10/063 705/7.11 |
| 2007/0192162 A1 * | 8/2007 | Simons | G06Q 30/02 705/7.29 |

(Continued)

FOREIGN PATENT DOCUMENTS

WO   WO2002010961 A2   2/2002

OTHER PUBLICATIONS

Shan-yan, "A Perspective of Two-dimensional Process Integration Customer Relationship Management Driven Business Model", I, Nov. 2009, ACM, pp. 1-6 (Year: 2009).*

(Continued)

*Primary Examiner* — Romain Jeanty
(74) *Attorney, Agent, or Firm* — Womble Bond Dickinson (US) LLP

(57) ABSTRACT

A first request is received at a server for a view of a chart graph from a client device over a network. The first request includes a first view identifier (ID) identifying a first of the views and a first filtering parameter for filtering data to be associated with the first view. A second request is transmitted to a CRM system over a network to retrieve live data associated with one or more chart elements of the first view. The second request includes information identifying the first filtering parameter such that only live data satisfying the first filtering parameter is retrieved from the CRM system. In response to the live data received from the remote CRM system, the live data is transmitted to the client device, wherein the client device renders a chart graph based on the live data and displays the chart graph at the client device.

21 Claims, 14 Drawing Sheets

(56) References Cited

U.S. PATENT DOCUMENTS

| | | | | | |
|---|---|---|---|---|---|
| 2008/0049022 | A1 | 2/2008 | Sherb | ................... | G06F 9/5038 |
| | | | | | 345/440 |
| 2009/0106691 | A1* | 4/2009 | Ballard | ................ | G06F 3/0481 |
| | | | | | 715/798 |
| 2009/0313121 | A1* | 12/2009 | Post | ....................... | G06Q 30/02 |
| | | | | | 705/14.53 |
| 2010/0057628 | A1* | 3/2010 | Trinidad | ................ | G06Q 10/06 |
| | | | | | 705/301 |
| 2010/0313009 | A1* | 12/2010 | Combet | ............. | G06Q 30/0204 |
| | | | | | 713/150 |
| 2012/0046996 | A1* | 2/2012 | Shah | .................. | G06Q 30/0204 |
| | | | | | 705/7.33 |
| 2012/0246027 | A1* | 9/2012 | Martin | ............... | G02B 27/0172 |
| | | | | | 705/26.63 |
| 2013/0218640 | A1* | 8/2013 | Kidder | ............... | G06Q 30/0254 |
| | | | | | 705/7.33 |
| 2014/0244351 | A1* | 8/2014 | Symons | ................. | G06F 16/13 |
| | | | | | 705/7.29 |
| 2015/0051957 | A1* | 2/2015 | Griebeler | ......... | G06Q 10/06395 |
| | | | | | 705/7.41 |
| 2015/0121299 | A1* | 4/2015 | Snyder | ................. | G06F 3/0481 |
| | | | | | 715/788 |
| 2015/0348589 | A1* | 12/2015 | Barisano, III | ...... | G06F 3/04847 |
| | | | | | 715/720 |
| 2016/0253706 | A1* | 9/2016 | Kursar | ................... | H04W 4/44 |
| | | | | | 705/14.58 |
| 2016/0335896 | A1* | 11/2016 | Iwamoto | ................ | G08G 1/005 |
| 2017/0102912 | A1* | 4/2017 | Jambulingam | .......... | G09B 5/08 |

OTHER PUBLICATIONS

Press Release Global Customer Relationship Management (CRM) Software Industry, Feb. 2014, Market Watch, pp. 1-11 (Year: 2014).

* cited by examiner

| Attribute Type 1 (e.g., level 1) | Attribute Type 2 (e.g., level 2) | Handler ID |
|---|---|---|
| Date | | Handler 1 |
| External | | Handler 2 |
| Internal | | Handler 3 |
| Owner | | Handler 4 |
| Date | External | Handler 5 |
| Date | Internal | Handler 6 |
| Date | Owner | Handler 7 |
| External | Date | Handler 8 |
| External | Internal | Handler 9 |
| External | Owner | Handler 10 |
| External | | Handler 11 |
| ... | ... | ... |

FIG. 4

| NAME | OWNER | CREATED | CLOSE DATE | | STAGE | | |
|---|---|---|---|---|---|---|---|
| Seattle Office<br>Longbow LLC | M.A. Michael An... | Apr 21, 2016 3:53... | Q3 | Jul 01, 2016 | Roadmap Discus... | | $500,000 |
| Bando DC Upgrade<br>Bando Products | M.A. Michael An... | Jun 07, 2016 2:23... | Q3 | Jul 01, 2016 | Contract Negotia... | | $250,000 |
| Leonhart Upgrade<br>Leonhart Company | C.L. Chris Luck | Jul 06, 2016 10:4... | Q3 | Jul 06, 2016 | | | |
| Production Failover<br>Superglass | M.A. Michael An... | Jul 12, 2016 5:45... | Q3 | Jul 07, 2016 | PO Received | | $200,000 |
| New SS Install<br>Roadwaves | M.A. Michael An... | Jul 01, 2016 12:4... | Q3 | Jul 08, 2016 | PO Received | | $500,000 |
| Storage Modernization<br>Leonhart Company | J.G. James Gon... | Jul 11, 2016 11:0... | Q3 | Jul 08, 2016 | Economics Prese... | | |
| US IT Expansion<br>Roadwaves LLC | R.C. Robert Co... | Jun 14, 2016 4:27... | Q3 | Jul 14, 2016 | Economics Prese... | | $800,000 |
| DC Improvement<br>Glossy Inc | M.A. Michael An... | Jul 01, 2016 12:4... | Q3 | Jul 15, 2016 | PO Received | | $800,000 |
| APJ IT Upgrade<br>Topaz Global | R.C. Robert Co... | Jul 01, 2016 12:4... | Q3 | Jul 15, 2016 | PO Received | | $250,000 |
| Parks Data Storage | M.A. Michael An | Jun 29, 2016 9:11 | Q3 | Jul 16, 2016 | Product Demo | | $700,000 |

METHOD AND SYSTEM FOR TWO-DIMENSIONAL CHARTING USING LIVE QUERIES

CROSS-REFERENCE TO RELATED APPLICATIONS

This application is a divisional application of U.S. patent application Ser. No. 15/223,673, filed on Jul. 29, 2016, which is incorporated by reference herein in its entirety.

FIELD OF THE INVENTION

Embodiments of the present invention relate generally to data processing by a data processing system. More particularly, embodiments of the invention relate to two-dimensional (2D) charting using live queries.

BACKGROUND

In a sales process, there is a significant value in slicing and dicing the opportunities in different data dimensions. Breaking down data by different attributes is an essential way to analyze sales team status, uncover resource allocation needs, compare opportunities by categories, and improve forecasting accuracy. Visually showing the data and drilling down into specific areas is valuable to building reports and understanding the state of each of the sales team's opportunities. Having the visual representation data segments linked to the corresponding individual opportunities not only is convenient but also enhancing the efficiency of sales processes.

Conventional systems have attempted to solve this problem by exporting opportunity data into spreadsheets, and using exported numbers to plot graphic data. However, most of the data utilized in plotting graphs are static data or previously obtained data (e.g., previously exported data) and may not represent the most recent data.

BRIEF DESCRIPTION OF THE DRAWINGS

Embodiments of the invention are illustrated by way of example and not limitation in the figures of the accompanying drawings in which like references indicate similar elements.

FIG. 4 is a block diagram illustrating an example of a handler mapping data structure according to one embodiment of the invention.

FIGS. 6A-6G are screenshots illustrating a graphical user interface of a charting system according to one embodiment of the invention.

DETAILED DESCRIPTION

Figure 1:
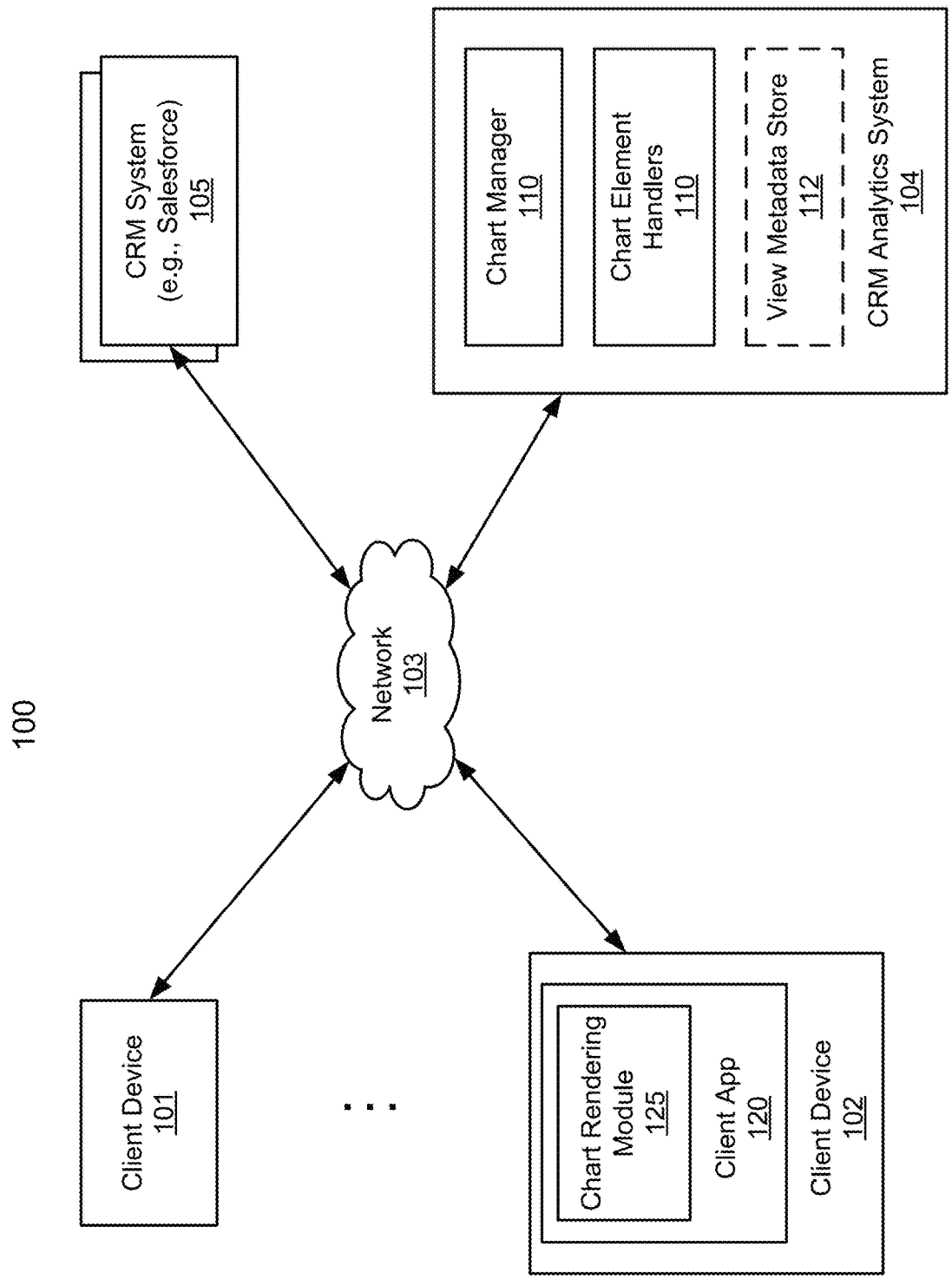
FIG. 1 is a block diagram illustrating a network configuration according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a charting system is provided to build on-demand queries to fetch real-time data from a data source, such as a customer relationship management (CRM) system, and to present the aggregates in two-dimensional (2D) chart (e.g., bar chart). Each bar represents the first dimension attribute value and labeled with name. It can be further broken down by a second dimension attribute and labeled with colors representing different values. Every bar and every piece of color in the bar can be activated (e.g., clickable) and linked to the corresponding individual opportunity data. One of the advantages is that it builds the queries on demand, taking different field types with various 2D combinations. It does not need to cache any pre-calculation and fulfill performance requirements.

In one embodiment, in response to a first request is received at a server for a view of a chart graph from a client device over a network. The first request includes a first view identifier (ID) identifying a first view and a filtering parameter for filtering data to be associated with the requested first view. In response to the first request, a second request is transmitted to a remote CRM system over the network to retrieve live data associated with one or more chart elements of the first view. The second request includes information identifying the first filtering parameter, such that only live data satisfying the first filtering parameter is retrieved from the remote CRM system. In response to the live data received from the remote CRM system, the live data is transmitted to the client device. The client device renders a chart graph based on the live data and displays the chart graph at the client device.

According to another embodiment, a first set of attributes is displayed in a first display area of a first display panel. The first set of attributes is associated with specific CRM data. In response to a first user activation of a first attribute of the first set, a first request is transmitted to a data analytics system over a network to request first CRM data associated with the first attribute. The first CRM data associated with the first attribute is received from the data analytics system. The data analytics system communicated with a CRM system hosted in a separate server over the network to retrieve the first CRM data in real-time based on the first attribute. A chart graph is rendered based on the first CRM data and displayed on a second display panel concurrently with the first display panel.

FIG. 1 is a block diagram illustrating a network configuration according to one embodiment of the invention. Referring to FIG. 1, system 100 includes, but is not limited to, one or more client systems 101-102 communicatively coupled to servers 104-105 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Network 103 may be any type of networks such as a local area network (LAN), a wide area network (WAN) such as the Internet, or a combination thereof, wired or wireless. Servers 104-105 can be any kinds of servers or a cluster of servers, such as, for example, Web servers, application servers, cloud servers, backend servers, etc.

CRM system 104 provides CRM services to a variety of clients, which may be constantly accessed and updated by the clients for managing their sales data. The CRM services may be provided by a variety of CRM vendors, such as, for example Salesforce.com, SAP AG, Oracle, and Microsoft. CRM is a term that refers to practices, strategies and technologies that companies use to manage and analyze customer interactions and data throughout the customer lifecycle, with the goal of improving business relationships with customers, assisting in customer retention and driving sales growth. CRM systems are designed to compile information on customers across different channels or points of contact between the customer and the company, which could include the company's website, telephone, live chat, direct mail, marketing materials and social media.

In one embodiment, CRM data analytics system or sever 104 provides data analytics services to clients 101-102 based on CRM data provided by CRM system 104. Server 104 is configured to provide charting services to clients 101-102 based on live CRM data retrieved from CRM system 105, such that clients 101-102 do not have to directly access CRM system 105 to obtain raw data and process the same. In one embodiment, server 104 includes, but is not limited to, chart manager 110, a set of chart element handlers 111, and optional view metadata store 112.

View metadata store 112 may be maintained in a persistent storage device (e.g., hard disk) associated with server 104. View metadata store 112 stores view metadata of a variety of chart views. A chart view refers to a particular view or layout of a chart graph, including a size, orientation, colors, locations, relative arrangement of different chart elements, etc. Such view metadata may be configured by an administrator of an organization or enterprise (e.g., a corporate or enterprise client) via a configuration interface such as a Web portal associated with server 104. Alternatively, the view metadata may be saved or cached from a client application (e.g., client application 120) of a client device. View metadata may further define or describe certain fields. For example, for a close date field, the metadata may specify the fiscal quarter boundary. For an owner field, the metadata may define a role hierarchy. View metadata store 112 may be used to save or cache a particular view of a chart graph for subsequent retrieval.

Chart manager 110 is configured to interface with clients 101-102 and manage chart element handlers 111 and their associated data within server 104. In one embodiment, each of chart element handlers 111 is configured to process CRM data associated with a specific attribute of a chart graph. Each of chart element handlers 111 can independently communicate with CRM system 105, for example, via a specific communication session, to retrieve a specific type of CRM data, using a communication protocol that is compatible with CRM system 105. Multiple char element handlers can communicate with CRM system 105 to retrieve CRM data in parallel. In one embodiment, a chart element handler may be configured to handle a CRM data associated with a specific type of an attribute or a combination of one or more attributes (e.g., filtering or group options).

Each of clients 101-102 includes a client application hosting a chart rendering module. In this example, client 102 includes client application 120 hosting chart rendering module 125 therein. Client application 120 may be a specific application (e.g., mobile or desktop application) installed at client 102. Alternatively, client application 120 may be browser-based application, where chart rendering module 125 may be a plugin application or an executable script (e.g., JavaScript). In one embodiment, when client 102 accesses server 104 via a browser application, it downloads a plugin or a JavaScript from server 104 and executed within the browser application. Note that client 101 may have the same or similar architecture as of client 102.

Figure 2:
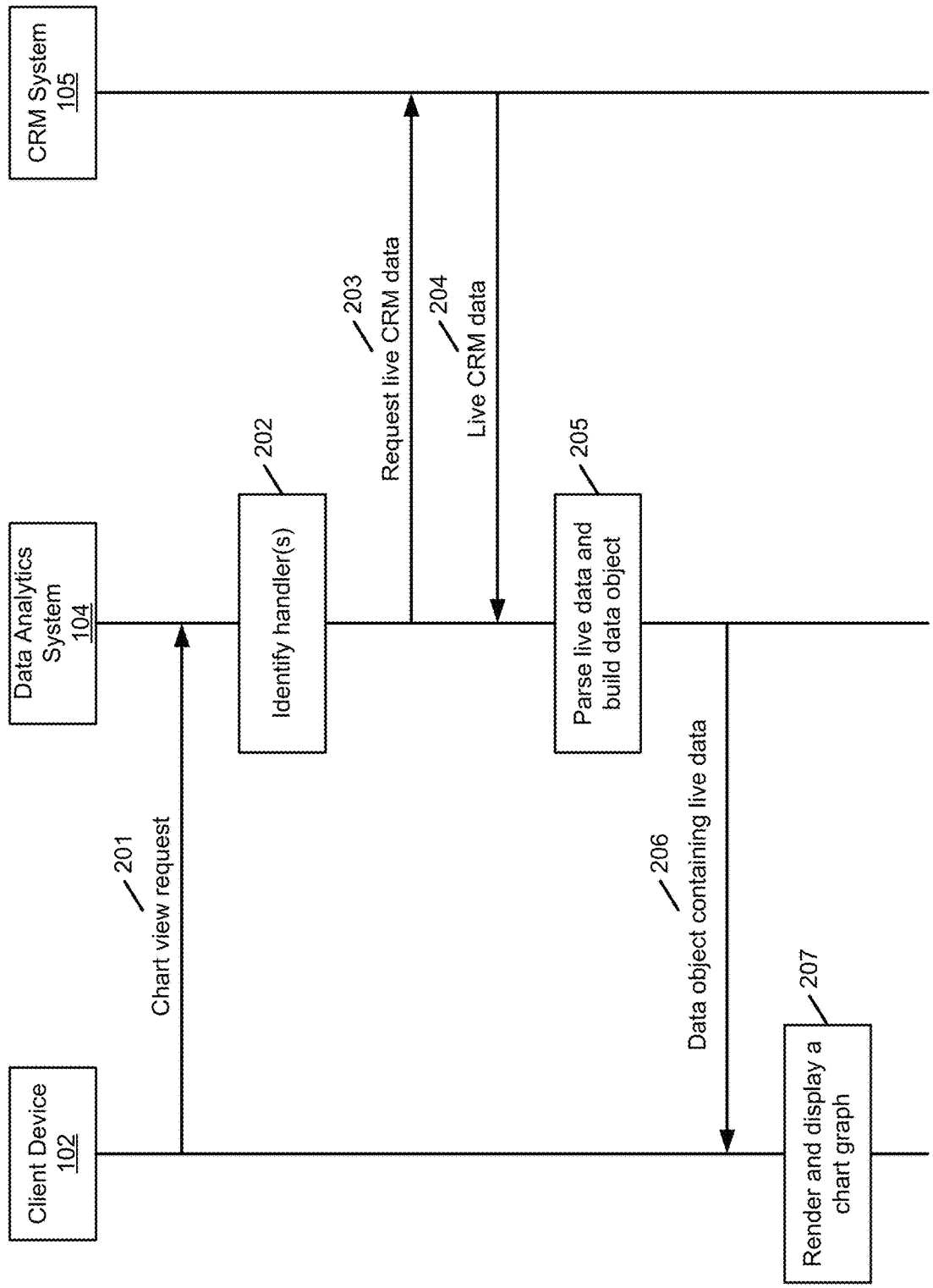
FIG. 2 is a diagram illustrating a processing flow of generating a chart graph using live queries according to one embodiment of the invention.

In one embodiment, client application 120 presents a graphical user interface (GUI), such as screenshots as shown in FIGS. 6A-6G, to a user of client 102. The user may interact with the content presented in the GUI. For example, a user may select one or more attributes or categories to display the associated CRM data in a chart. In response to the user interaction, referring now to FIGS. 1 and 2, a request is transmitted to server 104 from client 102 via path 201, where the request specifies the selected attribute or attributes. In response to the request, at block 202, chart manager identifies and selects one or more chart element handlers based on the type or types of the attributes.

Each of the selected chart element handlers builds a CRM query that is compatible with CRM system 105 and sends the query to CRM system 105 to retrieve live CRM data via path 203. Once a query result is received from CRM system 105 via path 204, a corresponding handler parses the query result to obtain the live CRM data at block 205 to build one or more data objects containing the chart data derived from the live CRM data. The handler then sends the data object(s) containing the live CRM data to client 102 via path 206. Client 102 renders a chart graph based on the data object(s) and display the chart graph at block 207. The corresponding view metadata may also be transmitted to client 102 to enable client 102 to render a chart in a proper format or layout. As a result, a chart graph is built on the live data obtained from CRM system 105 using live queries. The chart always represents the latest CRM data stored in the CRM system.

Note that although there is only one CRM system shown, multiple CRM systems may also be implemented. Handlers 111 of server 104 are capable of communicating with a variety of CRM system using the appropriate communication protocols. As a result, client 102 does not need to know how to specifically communicate with the CRM systems such as CRM system 105, in order to retrieve the live data for charting.

Figure 3:
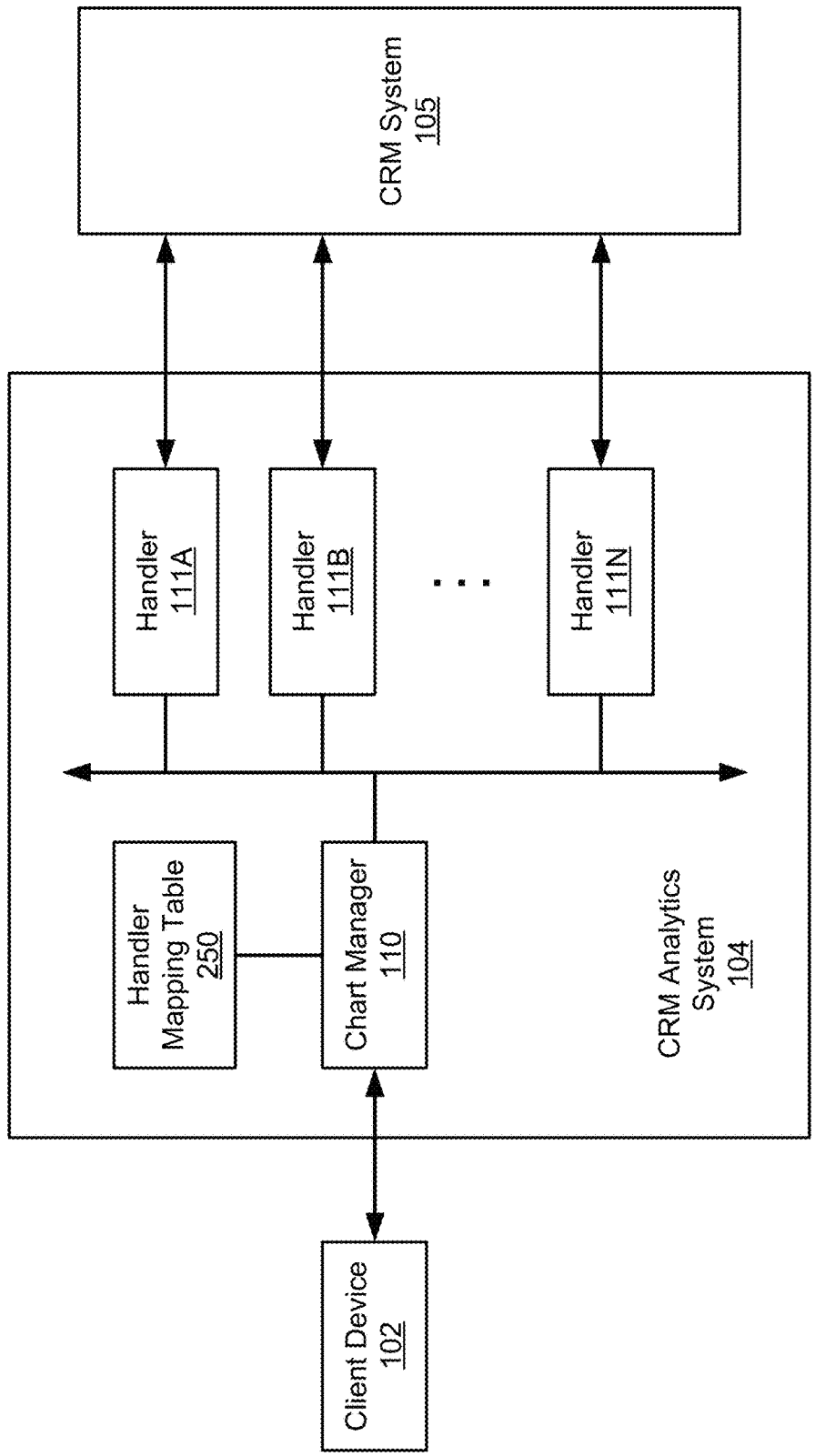
FIG. 3 is a block diagram illustrating an example of a data analytics system according to one embodiment of the invention.

FIG. 3 is a block diagram illustrating an example of a data analytics system according to one embodiment of the invention. Referring to FIG. 3, data analytics system 104 includes chart manager 110 and a set of chart element handlers 111A-111N. Data analytics system 101 further includes a handler mapping data structure, in this example, mapping table 250, to map one or more chart attributes to one of handlers 111A-111N. In one embodiment, in response to a request received from client 102, chart manager 110 examines one or more attributes specified in the request. Based on the type or types of the attributes, chart manager 110 looks up in handler mapping table 250 to identify one or more of handlers 111A-111N corresponding to the types of attributes. In one embodiment, handler mapping table 250 includes a number of mapping entries. Each mapping entry maps one or more attributes in combination or in sequential order to a handler ID identifying one of handlers 111A-111N.

In one embodiment, a handler selected by chart manager 110 builds a CRM query based on the attribute or field type. The handler sends the CRM query to CRM system 105 using a communication protocol that is compatible with CRM system 105. For example, if CRM system 105 is a Saleforce.com compatible CRM system, the handler builds a query compatible with the Saleforce.com object query language (SOQL) and sends the query to CRM system 105. Once a query result is received from CRM 105, the handler parses the query result and repackages the CRM data from the query result into a data object that is compatible with client 102, such as, for example, a JavaScript object notation (JSON) object. Client 102 then processes the data object, renders a chart graph, and displays the chart graph on a display device of client 102.

FIG. 4 is a block diagram illustrating an example of a handler mapping data structure according to one embodiment of the invention. Referring to FIG. 4, mapping table 400 may represent mapping table 250 of FIG. 3. In one embodiment, handler mapping table 400 includes a number of mapping entries. Each mapping entry maps first attribute or field type 401 and optional second attribute or field type 402 to a handler ID 403 identifying one of the handlers 111A-111N. First attribute type 401 represents a first level or first dimension of attribute type and second attribute type 402 represents a second level or second dimension of attribute type. In some situations, there is only single level of attribute mapping. In other situations, there are at least two levels of attribute mapping. More than two levels may be implemented. In one embodiment, a combination of two levels of attributes can be mapped to a handler. In another embodiment, a permutation of two levels of attributes is mapped to a handler. In this example, mapping entries 411 and 412 will be different because the sequential orders or permutations of attributes of both entries are different. Thus, dependent upon which attributes at which levels a user selects, a different handler may be selected from mapping table 400.

Figure 5:
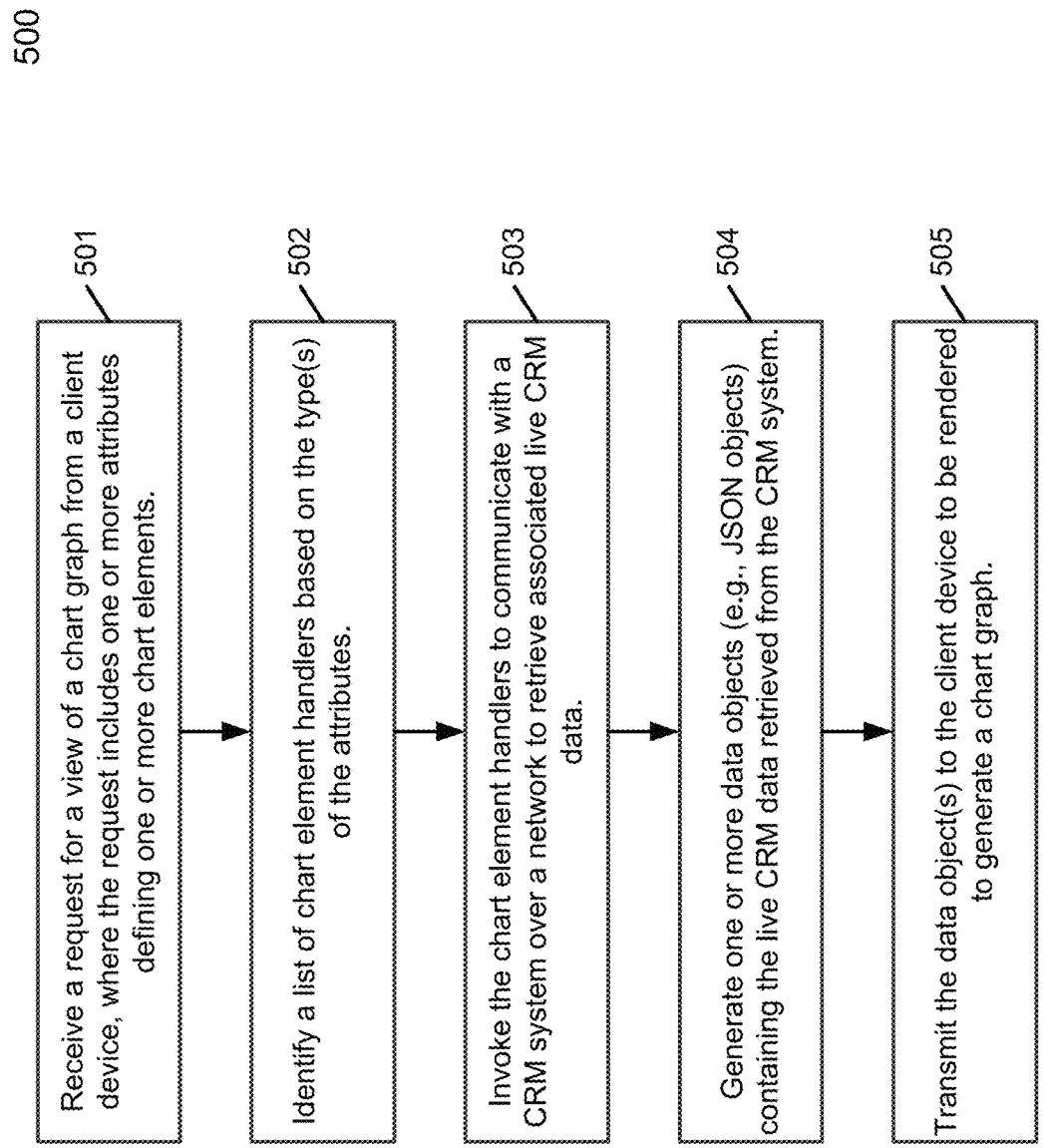
FIG. 5 is a flow diagram illustrating a process of generating a chart based on live queries according to one embodiment of the invention.

In one embodiment, the list of handlers includes:
OneLevel: DateHierarchy Handler
OneLevel: External Handler
OneLevel: Internal Handler
OneLevel: OwnerHierarchy Handler
TwoLevel: DateHierarchy_External Handler
TwoLevel: DateHierarchy_Internal Handler
TwoLevel: DateHierarchy_OwnerHierarchy Handler
TwoLevel: External_DateHierarchy Handler
TwoLevel: External_External Handler
TwoLevel: External_Internal Handler
TwoLevel: External_OwnerHierarchy Handler
TwoLevel: Internal_DateHierarchy Handler
TwoLevel: Internal_External Handler
TwoLevel: Internal_Internal Handler
TwoLevel: Internal_OwnerHierarchy Handler
TwoLevel: OwnerHierarchy_DateHierarchy Handler
TwoLevel: OwnerHierarchy_External Handler
TwoLevel: OwnerHierarchy_Internal Handler
TwoLevel: OwnerHierarchy_OwnerHierarchy Handler FIG. 5 is a flow diagram illustrating a process of generating a chart based on live queries according to one embodiment of the invention. Process 500 may be performed by processing logic which may include software, hardware, or a combination thereof. For example, process 500 may be performed by system 300 of FIG. 3. Referring to FIG. 5, at block 501, receive a request for a view of a chart graph from a client device. The request includes one or more attributes defining one or more chart elements. In response to the request, at block 502, processing logic identifies one or more chart element handlers based on a type of the attributes. At block 503, the chart element handlers are invoked to concurrently communicate with a CRM system over a network to retrieve CRM data based on the attributes. The handlers generate queries that are compatible with the CRM system. In response to the CRM data retrieved from the CRM system, at block 504, processing logic parses the CRM data and generates a data object (e.g., JSON object) containing the CRM data. At block 505, processing logic transmit the data object having the CRM data therein to the client device. The client device renders the chart graph based on the CRM data and displays the chart graph at a display device of the client device.

The charting techniques described throughout this application can dramatically reduce the time to build charts for sakes reports. Using the graphic presentation with a real-time query speeds up the time to understand the distribution of selected opportunities. It also makes comparing amongst distributions of the given attributes straightforward. Sales representatives, managers, and executives are entitled to slicing and dicing data much more efficiently than using traditional ways. More focus can be freed from building a chart and put into solving a problem uncovered from the chart. In one embodiment, such features are enabled by a set of charting handlers, each of which handles a specific 2D combination. Each handler builds the tailored queries, based on the type of each dimension, taking performance and numbers of queries into consideration. Queries are executed towards a data source in parallel. Query results are then merged and manipulated to be in a form suitable for representation.

Figure 6A:

FIGS. 6A-6G are screenshots illustrating a graphical user interface of a charting system according to one embodiment of the invention. The GUI as shown in FIGS. 6A-6G may be rendered and displayed by a client application of a client device, such as, for example, client application 120 of client device 102 as shown in FIG. 1. Referring to FIG. 6A, the example GUI page includes a first display panel 601 and a second display panel 602. Within display panel 601, there are filter page 603 and group page 604 that each can be activated and displayed one at a time. In the example as shown in FIG. 6A, filter page 603 is displayed within display panel 601. Within filter page 603, a list of filters is displayed and each one of the filters can be configured to specify a particular filtering parameter. Each filter parameter is considered as an attribute.

In this example, the list of filters includes scope, deal size, close date, forecast, stage, competitor, competitor status, region, reseller, deal status, etc. A user can specify any one or more of these attributes to retrieve live data associated with or satisfying the specified attributes. For example, a user can specify a specific range deal size (e.g., $100 k to $500 k) of an opportunity. In response to the user selection, the underlying logic of a client application generates a request, including the specified attribute(s) and sends the request to a CRM data analytics system (e.g., server 104) to request the live CRM data. The data analytics system in turn communicates with the corresponding CRM system to fetch the live CRM data using the appropriate handlers as described above. The live CRM data is then transmitted from the analytics system and received at the client device. The live CRM data is displayed within display panel 602.

In one embodiment, the live CRM data can be displayed in a grid view or a chart view by activating grid view button 605 or chart view button 606, respectively. In this example as shown in FIG. 6A, the live CRM data, which has been filtered by one or more filters specified in display panel 601, is displayed in a grid view. In addition, when a user moves the cursor hovering over the current filtered options, a tip window or pop-up window is displayed to show at least some details of the filtering settings. In this example, the "close date" filtering option has been set to "this quarter" and "next quarter." The "forecast" filtering option has been set to "pipeline," "best case," "commit," and "closed." The live CRM data as shown in display panel 602 has been obtained and filtered based on these filtering options. These filtering options or parameters are also sent to the data analytics system together with the request and the data analytics system fetches only the CRM data satisfying these filtering parameters.

Referring now to FIG. 6B, in this example, group page 604 is selected and displayed within display panel 601. There can be multiple grouping options in multiple levels. In this example, the first level is owner grouping option 611 displayed in a first display area and the second level is stage grouping option 612 displayed in a second display area of display panel 601. Each of the grouping options can be expanded or collapsed in display panel 601. Each of the groups in each grouping option includes the associated CRM data, for example, deal size and a number of deals. In this example, there are 5 deals in the stage of "Intro Meeting" and the total size is $145K. A user can select any one of the attributes in the first level 611 and second level 612. When a user selects one or both levels, a request is transmitted to data analytics server 104 for retrieving live CRM data satisfying the selection. The analytics server 104 identifies a corresponding handler based on the types of attributes associated with first level 611 and second level 612 based on handler mapping table as shown in FIG. 4. The CRM data, which is displayed in a grid format, can also be displayed in a chart format by activating chart button or control 606.

Figure 6C:
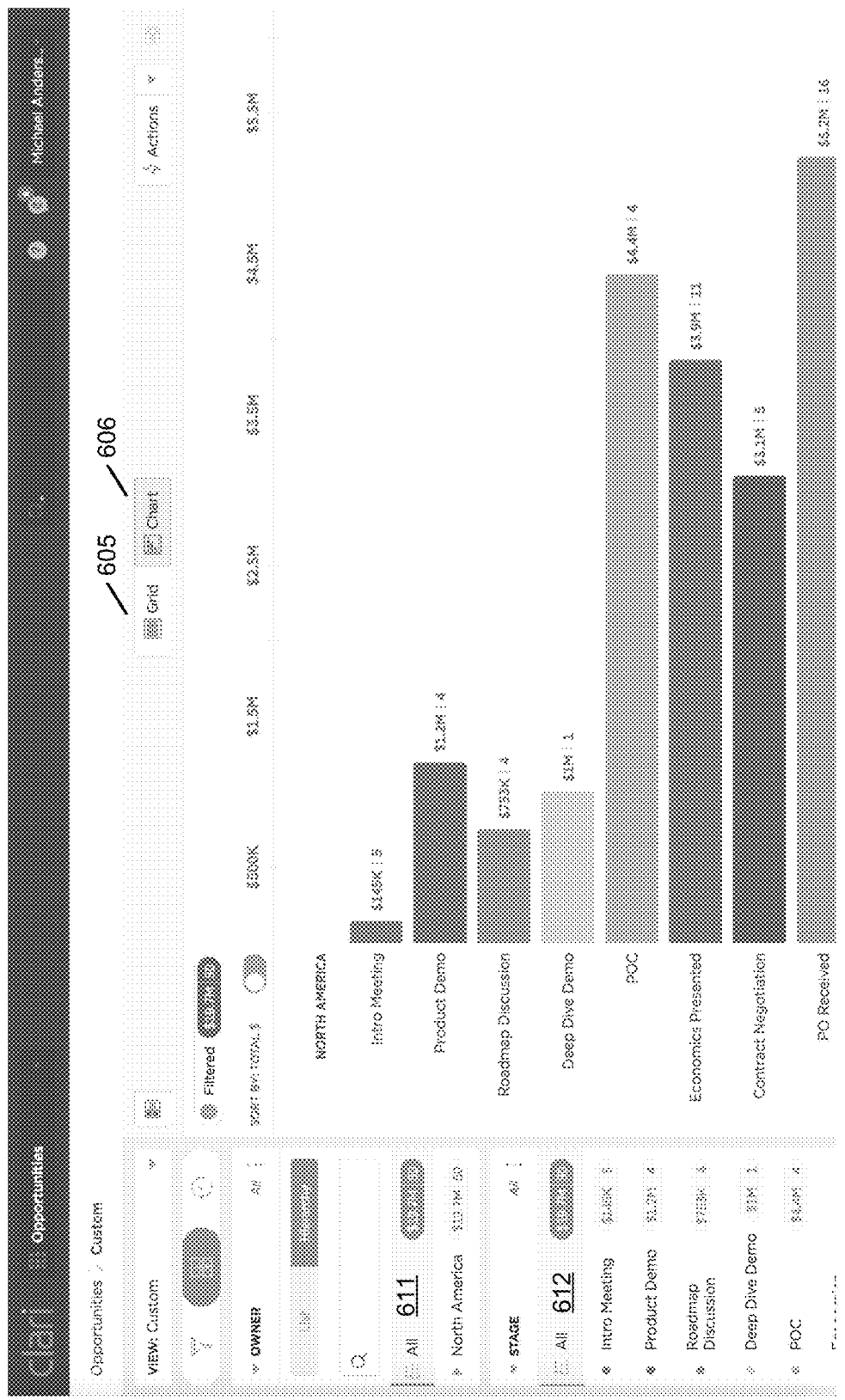

FIG. 6C is a screenshot illustrating a chart graphical user interface, which may be displayed in response to an activation of chart button 606 of FIG. 6B. In this example, the user has selected an attribute of all groups at the first level and an attribute of all stages at the second level. In response to the selection, a request may be sent to the data analytics system 104 to retrieve the live CRM data. The CRM data is displayed within display panel 602, including a number of rows of bars. Each row corresponds to one of the stages, while the length of bar in a horizontal direction represents the deal size associated with that particular stage. The chart rendering module of the client may automatically select different colors for the bars.

Figure 6D:

FIG. 6D is a screenshot illustrating a different view of chart graph, which may be displayed in response to an activation of link 613 that expands the grouping of "North America." In this example, group "North America" includes Central, East, and West. In response to the selection, a request is sent to data analytics system 104 over a network to retrieve live CRM data associated with Central, East, and West groups. A bar chart is displayed in display panel 602. In this example, the rows of bars represent the groups at the first level or first dimension (e.g., Central, East, and West). Each bar now is displayed in segments and each segment has a different color. Each segment represents one of the stages 612 at a second level or second dimension. In one embodiment, each segment of each bar can be activated to retrieve and display further detailed information (e.g., live information) of that particular segment, i.e., a particular group of a particular stage. The request sent to data analytics system will include two levels of attribute selections: 1) group (e.g., Central, East, or West) and 2) stage as one of the stages 612. A single request may include all the attribute selections. Alternatively, multiple requests may be generated and sent to the data analytics system, one request corresponding to a combination of a group attribute (level 1) and a stage attribute (level 2). The current selections of attributes, in this example, "filtered" and "North America," are also indicated in selection status area 680.

Figure 6E:
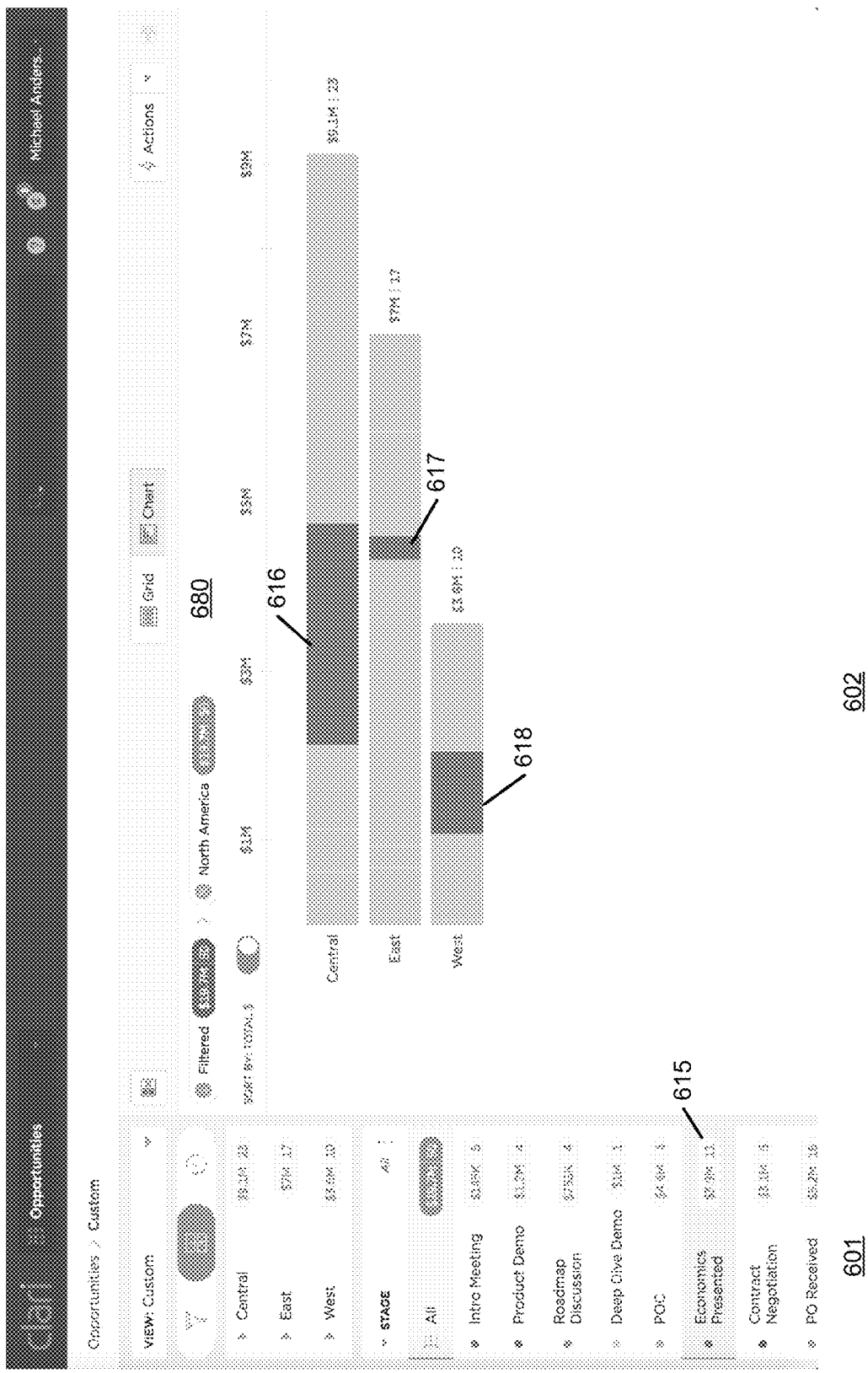

Referring now to FIG. 6E, according to one embodiment, when a cursor is positioned hovering over an attribute displayed in display panel 601, such a user action is detected by the underlying logic. In response, the chart elements displayed in display panel 602 corresponding to the attribute may be specifically indicated amongst the rest of chart elements, for example, in a different color, focused, highlighted, etc. In this example as shown in FIG. 6E, the cursor is positioned on the top of attribute 615. In response to the selection of attribute 615, the corresponding chart elements, in this example, segments 616-618, are highlighted. The rest of the chart elements or segments may be grayed out.

Figure 6F:
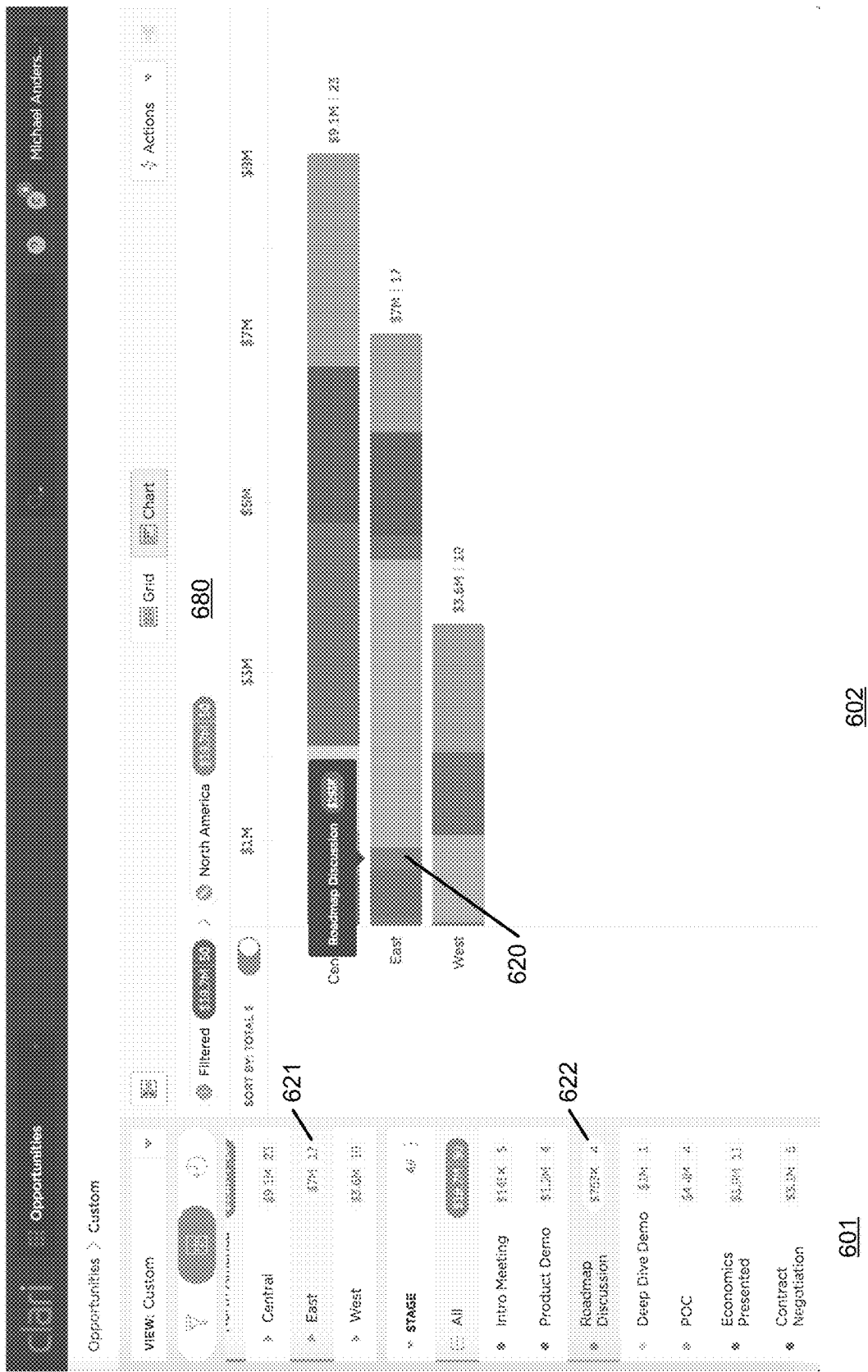

Referring now to FIG. 6F, similarly, when a cursor is positioned hovering over a chart element or segment displayed in display panel 602, the corresponding attribute or attributes displayed in display panel 601 may be highlighted. In this example, a cursor is positioned on the top of a segment within a bar associated with the group of "East." In response, a tip or pop-up window is displayed showing the detailed information associated with the segment, in this example, the name of the corresponding attribute 622 and its corresponding deal size. In addition, attributes 621 and 622 corresponding to the "selected" segment are also highlighted. As described above, each of the segments or chart elements as displayed in display panel 602 can be activated to retrieve and display further details of the segment or chart element (i.e., drilled down).

Figure 6G:
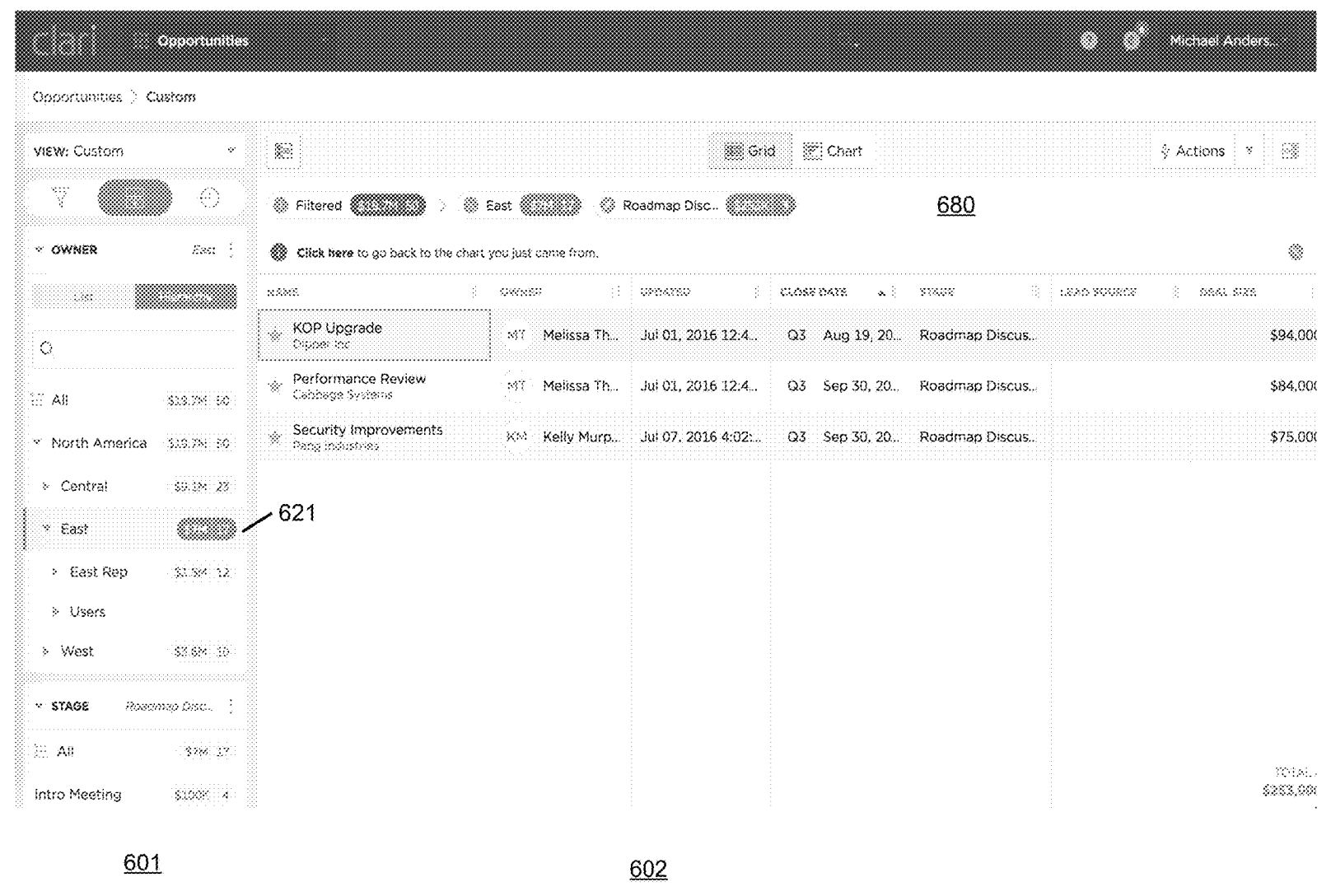

For example, if a user clicks on segment 620 from FIG. 6F, the detailed information concerning segment 620 will be displayed as shown in FIG. 6G. Referring now to FIG. 6G, detailed information of opportunities for group "East" in stage "Roadmap Discussion" is displayed in a chart view in display area 602. The data associated with the chart view in display area 602 may be retrieved from a CRM data analytics system, which in turn fetches the live CRM data from a CRM system as described above. In addition, the status bar 680 now indicated that the displayed chart is associated with group "East" and stage "Roadmap Discussion."

Note that a button, a control, or a link displayed in a GUI page described throughout this application can be activated in a variety of methods, such as, for example, a clicking event, one or more keystrokes from a keyword, a voice interactive command, or a combination thereof. Also note that the format or layout as shown in FIGS. 6A-6G are shown and described for the purpose of illustration only. Other formats or layouts may also be implemented.

Figure 7:
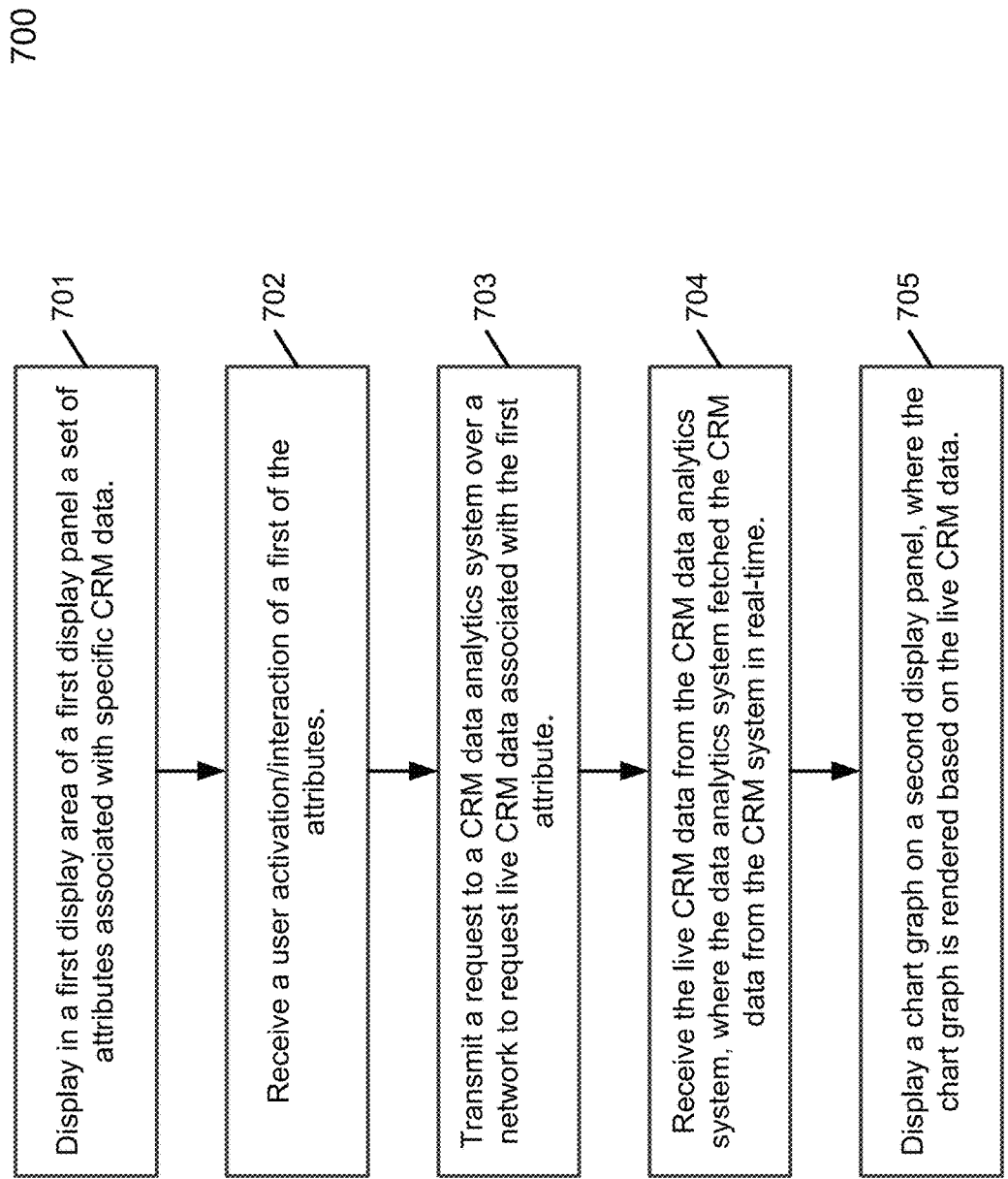
FIG. 7 is a flow diagram illustrating a process of rendering and presenting a chart graph using live queries according to one embodiment of the invention.

FIG. 7 is a flow diagram illustrating a process of rendering and presenting a chart graph using live queries according to one embodiment of the invention. Process 700 may be performed by processing logic which may include software, hardware, or a combination thereof. For example, process 700 may be performed by client device 102 of FIG. 1. Referring to FIG. 7, at block 701, processing logic displays, in a first display area of a first display panel, a first set of attributes associated with specific CRM data. At block 702, processing logic receives a user activation of a first of the attributes of the first set displayed in the first display panel. In response to the user activation, at block 703, processing logic transmits a request to a data analytics system over a network requesting CRM data associated with the first attribute. At block 704, the requested CRM data is received from the data analytics system. The CRM data was obtained by the data analytics system in real-time from a corresponding CRM system. At block 705, a chart graph is generated based on the CRM data and the chart graph is displayed on a second display panel concurrently with respect to the first display panel.

Note that some or all of the components as shown and described above (e.g., chart manager 110 and handlers 111 of FIG. 1) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
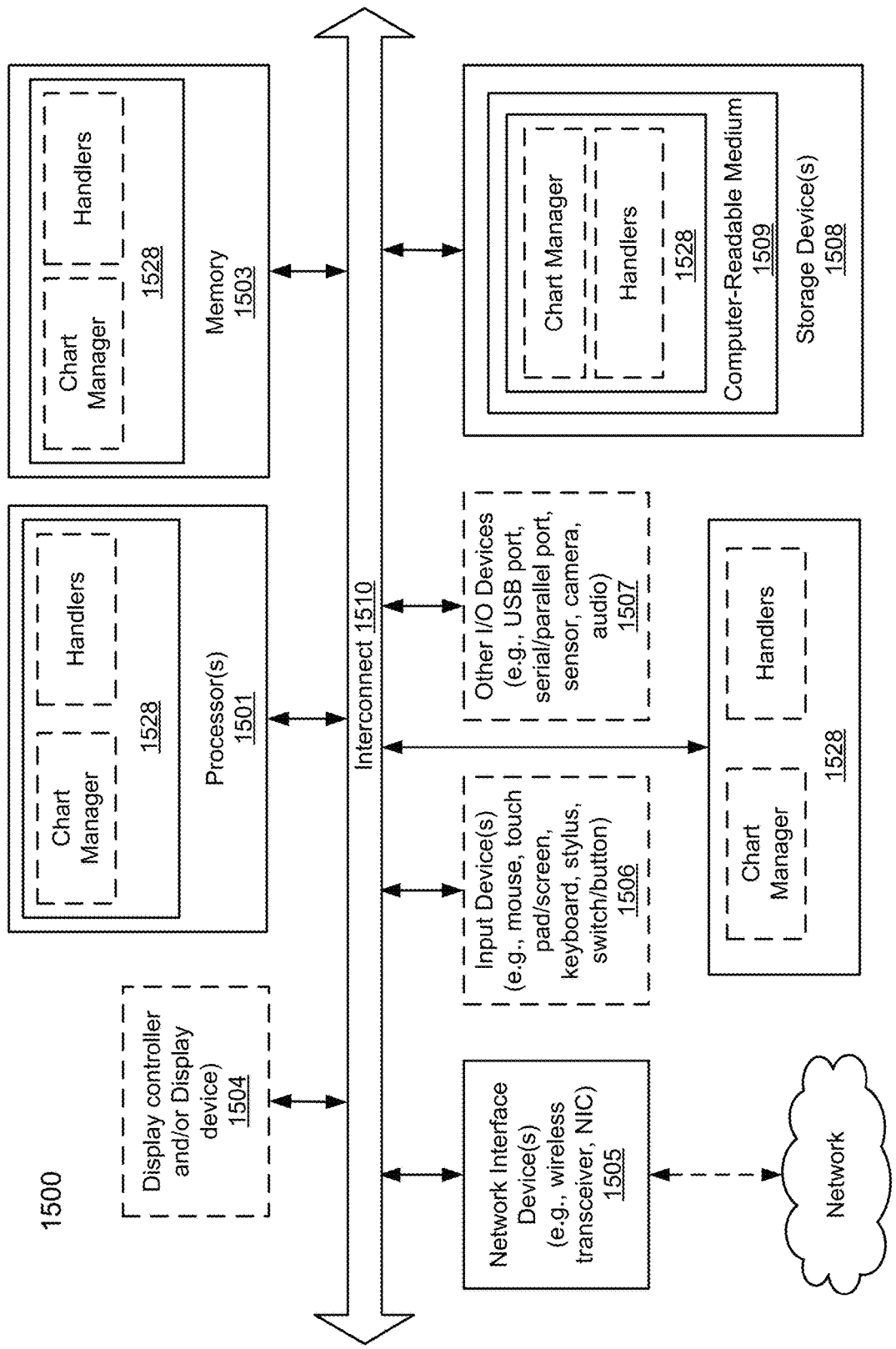
FIG. 8 is a block diagram illustrating a data processing system according to one embodiment.

FIG. 8 is a block diagram illustrating an example of a data processing system which may be used with one embodiment of the invention. For example, system 1500 may represents any of data processing systems described above performing any of the processes or methods described above, such as, for example, client devices 101-102 and servers 104-105 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
   displaying, in a first display area of a first display pane of a display device, a first set of attributes associated with specific customer relationship management (CRM) data;
   in response to a first user activation of a first of the attributes of the first set received from a user, transmitting a first request to a data analytics system over a network requesting first CRM data associated with the first attribute;
   receiving the requested first CRM data associated with the first attribute from the data analytics system, wherein the data analytics system communicated with a CRM system hosted in a separate server over the network to retrieve the first CRM data based on the first attribute in real-time; and
   displaying a chart graph on a second display panel of the display device based on the first CRM data, wherein the first display panel and the second display panel are displayed separately and concurrently on the display device.

2. The method of claim 1, further comprising:
   displaying in a second displaying area of the first display panel a second set of attributes associated with the first CRM data; and
   displaying the chart graph in a plurality of segments, each segment corresponding one of the attributes in the second set.

3. The method of claim 2, wherein each of the segments is displayed in a different color, and wherein each of the segment can be activated to display detailed information of the activated segment.

4. The method of claim 2, further comprising:
   receiving a second user activation of a first of the plurality of segments displayed in the second display panel;
   in response to the second user activation, transmitting a second request to the data analytics system over the network requesting second CRM data associated with the first attribute and the first segment; and
   in response to the second CRM data received from the data analytics system, displaying a second chart graph on the second display panel based on the second CRM data, wherein the second CRM data is retrieved from the CRM system in real-time by the data analytics system.

5. The method of claim 2, further comprising:
   receiving a signal indicating that a cursor is hovering over a second of the attributes of the second set displayed on the first display panel; and
   highlighting a second of the plurality of segments displayed on the second display panel, the second segment corresponding to the second attribute.

6. The method of claim 2, further comprising:
   receiving a signal indicating that a cursor is hovering over a third of the plurality of segments displayed on the second display panel; and
   displaying detailed information of the third segment in a tip window displayed on the second display panel.

7. The method of claim 6, further comprising highlighting a third attribute of the second set displayed on the second display area of the first display panel, the third attribute corresponding to the third segment.

8. A non-transitory machine-readable medium having instructions stored therein, which when executed by a processor, cause a processor to perform operations, the operations comprising:
   displaying, in a first display area of a first display pane of a display device, a first set of attributes associated with specific customer relationship management (CRM) data;
   in response to a first user activation of a first of the attributes of the first set received from a user, transmitting a first request to a data analytics system over a network requesting first CRM data associated with the first attribute;
   receiving the requested first CRM data associated with the first attribute from the data analytics system, wherein the data analytics system communicated with a CRM system hosted in a separate server over the network to retrieve the first CRM data based on the first attribute in real-time; and
   displaying a chart graph on a second display panel of the display device based on the first CRM data, wherein the first display panel and the second display panel are displayed separately and concurrently on the display device.

9. The machine-readable medium of claim 8, wherein the operations further comprise:
   displaying in a second displaying area of the first display panel a second set of attributes associated with the first CRM data; and
   displaying the chart graph in a plurality of segments, each segment corresponding one of the attributes in the second set.

10. The machine-readable medium of claim 9, wherein each of the segments is displayed in a different color, and wherein each of the segment can be activated to display detailed information of the activated segment.

11. The machine-readable medium of claim 9, wherein the operations further comprise:
    receiving a second user activation of a first of the plurality of segments displayed in the second display panel;
    in response to the second user activation, transmitting a second request to the data analytics system over the network requesting second CRM data associated with the first attribute and the first segment; and
    in response to the second CRM data received from the data analytics system, displaying a second chart graph on the second display panel based on the second CRM data, wherein the second CRM data is retrieved from the CRM system in real-time by the data analytics system.

12. The machine-readable medium of claim 9, wherein the operations further comprise:
    receiving a signal indicating that a cursor is hovering over a second of the attributes of the second set displayed on the first display panel; and
    highlighting a second of the plurality of segments displayed on the second display panel, the second segment corresponding to the second attribute.

13. The machine-readable medium of claim 9, wherein the operations further comprise:
   receiving a signal indicating that a cursor is hovering over a third of the plurality of segments displayed on the second display panel; and
   displaying detailed information of the third segment in a tip window displayed on the second display panel.

14. The machine-readable medium of claim 13, wherein the operations further comprise highlighting a third attribute of the second set displayed on the second display area of the first display panel, the third attribute corresponding to the third segment.

15. A data processing system, comprising:
   a processor; and
   a memory coupled to the processor to store instructions, which when executed by the processor, cause the processor to perform operations, the operations including
      displaying, in a first display area of a first display pane of a display device, a first set of attributes associated with specific customer relationship management (CRM) data,
      in response to a first user activation of a first of the attributes of the first set received from a user, transmitting a first request to a data analytics system over a network requesting first CRM data associated with the first attribute,
      receiving the requested first CRM data associated with the first attribute from the data analytics system, wherein the data analytics system communicated with a CRM system hosted in a separate server over the network to retrieve the first CRM data based on the first attribute in real-time, and
      displaying a chart graph on a second display panel of the display device based on the first CRM data, wherein the first display panel and the second display panel are displayed separately and concurrently on the display device.

16. The system of claim 15, wherein the operations further comprise:
   displaying in a second displaying area of the first display panel a second set of attributes associated with the first CRM data; and
   displaying the chart graph in a plurality of segments, each segment corresponding one of the attributes in the second set.

17. The system of claim 16, wherein each of the segments is displayed in a different color, and wherein each of the segment can be activated to display detailed information of the activated segment.

18. The system of claim 16, wherein the operations further comprise:
   receiving a second user activation of a first of the plurality of segments displayed in the second display panel;
   in response to the second user activation, transmitting a second request to the data analytics system over the network requesting second CRM data associated with the first attribute and the first segment; and
   in response to the second CRM data received from the data analytics system, displaying a second chart graph on the second display panel based on the second CRM data, wherein the second CRM data is retrieved from the CRM system in real-time by the data analytics system.

19. The system of claim 16, wherein the operations further comprise:
   receiving a signal indicating that a cursor is hovering over a second of the attributes of the second set displayed on the first display panel; and
   highlighting a second of the plurality of segments displayed on the second display panel, the second segment corresponding to the second attribute.

20. The system of claim 16, wherein the operations further comprise:
   receiving a signal indicating that a cursor is hovering over a third of the plurality of segments displayed on the second display panel; and
   displaying detailed information of the third segment in a tip window displayed on the second display panel.

21. The system of claim 20, wherein the operations further comprise highlighting a third attribute of the second set displayed on the second display area of the first display panel, the third attribute corresponding to the third segment.

* * * * *